US011105467B2

(12) United States Patent
Krogsgaard et al.

(10) Patent No.: US 11,105,467 B2
(45) Date of Patent: Aug. 31, 2021

(54) CONTROL OF A HYDROGEN REFUELING STATION

(71) Applicant: Nel Hydrogen A/S, Herning (DK)

(72) Inventors: Jacob Krogsgaard, Holstebro (DK); Ulrik Torp Svendsen, Herning (DK); Jacob Appelt Vibe Svendsen, Silkeborg (DK); Joshua Andrew Adams, Herning (DK)

(73) Assignee: NEL HYDROGEN A/S, Herning (DK)

( * ) Notice: Subject to any disclaimer, the term of this patent is extended or adjusted under 35 U.S.C. 154(b) by 0 days.

(21) Appl. No.: 16/294,989

(22) Filed: Mar. 7, 2019

(65) Prior Publication Data

US 2019/0277448 A1    Sep. 12, 2019

(30) Foreign Application Priority Data

Mar. 7, 2018 (DK) .............. PA 2018 70148

(51) Int. Cl.
*F17C 5/06* (2006.01)
*F16K 31/02* (2006.01)
*F17C 13/04* (2006.01)

(52) U.S. Cl.
CPC .............. *F17C 5/06* (2013.01); *F16K 31/02* (2013.01); *F17C 13/04* (2013.01);
(Continued)

(58) Field of Classification Search
CPC .... F17C 5/06; F17C 13/04; F17C 2250/0626; F17C 2260/02; F17C 2225/0123;
(Continued)

(56) References Cited

U.S. PATENT DOCUMENTS 4,263,945 A * 4/1981 Van Ness .............. B67D 7/348
                                                    137/234.6
5,385,176 A * 1/1995 Price ......................... F17C 5/06
                                                    141/1
(Continued)

FOREIGN PATENT DOCUMENTS

CN       106195618 A      12/2016
EP         3076017 A1 * 10/2016 .............. F04B 35/04
(Continued)

OTHER PUBLICATIONS

JP-2014238159-A English Translation of Specification (Year: 2020).*
(Continued)

*Primary Examiner* — Timothy P. Kelly
*Assistant Examiner* — Stephanie A Shrieves
(74) *Attorney, Agent, or Firm* — Cantor Colburn LLP

(57) ABSTRACT

The invention related to a system for control of a hydrogen refueling station. The control of the hydrogen refueling station is optimized according to a high frequency tank profile in a time period between time A and time B. The high frequency tank profile includes selecting a first of the plurality of vessels as supply to the compressor during at least part of the refueling of the vehicle tank, the selection is based on pressure of hydrogen gas in one or more vessels of the supply storage. The control of the hydrogen refueling station is furthermore optimized according to a low frequency tank profile in a time period between time C and time D. The low frequency tank profile includes preparing one or more hydrogen refueling station components to enable a plurality of vehicle tank refuelings in the subsequent time period between time A and time B.

16 Claims, 1 Drawing Sheet

(52) U.S. Cl.
CPC ............. *F17C 2205/0323* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0157* (2013.01); *F17C 2227/0337* (2013.01); *F17C 2227/042* (2013.01); *F17C 2250/03* (2013.01); *F17C 2250/043* (2013.01); *F17C 2250/0473* (2013.01); *F17C 2250/0626* (2013.01); *F17C 2250/0636* (2013.01); *F17C 2250/072* (2013.01); *F17C 2260/02* (2013.01); *F17C 2265/065* (2013.01); *F17C 2270/0139* (2013.01); *F17C 2270/0168* (2013.01)

(58) Field of Classification Search
CPC ........ F17C 2223/036; F17C 2270/0139; F17C 2250/043; F17C 2227/042; F17C 2223/0123; F17C 2225/03; F17C 2265/065; F17C 2250/072; F17C 2225/0636; F17C 2250/0473; F17C 2205/0323; F17C 2221/012; F17C 2227/0157; F17C 2227/0337; F17C 2270/0168; F16K 31/02; B65B 1/26
USPC .......................................................... 141/11
See application file for complete search history.

(56) References Cited

U.S. PATENT DOCUMENTS

| | | | | |
|---|---|---|---|---|
| 7,523,770 | B2* | 4/2009 | Horowitz | G06Q 50/30 |
| | | | | 141/94 |
| 9,151,448 | B2* | 10/2015 | Cohen | F17C 5/06 |
| 9,739,418 | B2 | 8/2017 | Elogowainy | |
| 2009/0205745 | A1* | 8/2009 | Farese | F17C 13/026 |
| | | | | 141/12 |
| 2011/0303323 | A1* | 12/2011 | Ding | B65B 1/20 |
| | | | | 141/11 |
| 2012/0000574 | A1* | 1/2012 | Nishiumi | F17C 5/06 |
| | | | | 141/94 |
| 2012/0318403 | A1* | 12/2012 | Cohen | F17C 7/02 |
| | | | | 141/3 |
| 2013/0068345 | A1* | 3/2013 | Ding | B65B 1/20 |
| | | | | 141/11 |
| 2013/0248000 | A1* | 9/2013 | Killeen | F17D 3/00 |
| | | | | 137/14 |
| 2015/0090364 | A1* | 4/2015 | Elgowainy | F17C 5/06 |
| | | | | 141/4 |
| 2016/0290562 | A1* | 10/2016 | Okuno | F04B 41/02 |
| 2017/0254479 | A1* | 9/2017 | Petersen | F17C 5/00 |
| 2017/0314734 | A1* | 11/2017 | Jung | F17C 5/06 |

FOREIGN PATENT DOCUMENTS

| | | |
|---|---|---|
| EP | 3076017 A1 | 10/2016 |
| EP | 3106739 A1 | 12/2016 |
| JP | 2014238159 A * | 12/2014 |
| WO | 2016180425 A1 | 11/2016 |
| WO | 2016184468 A1 | 11/2016 |
| WO | 2017126580 A1 | 7/2017 |

OTHER PUBLICATIONS

European Search Report for the corresponding application EP19160518; Report dated Jul. 24, 2019.

* cited by examiner

CONTROL OF A HYDROGEN REFUELING STATION

CROSS REFERENCE TO RELATED APPLICATION

This application is related to and claims the benefit of Danish Patent Application Number PA 2018 70148 filed on Mar. 7, 2018, the entire contents of which are incorporated herein by reference in their entirety.

FIELD OF THE INVENTION

The invention relates to a hydrogen refueling station and the control hereof.

BACKGROUND OF THE INVENTION

Control of a hydrogen refueling station, for refueling of a vehicle tank in a fast and secure manner has been the object of quite a number of publications over the years. One example representing such prior publications is EP3106739. Here is disclosed a hydrogen refueling station having two compressors connected to an accumulator where between gas flow can be controlled by valves. The position of the valves may either lead the gas through the accumulator or bypass the accumulator on its way from the compressor to the vehicle tank.

The problem with the prior art including EP3106739 is that compressors are used to fill accumulators are stopped and then subsequently started again when a vehicle is to be refueled. This way of controlling the compressor leads to many start/stops of the compressor which is both expensive in relation to power consumption and in relation to wear of compressor parts.

SUMMARY OF THE INVENTION

It is therefore an object of the present to facilitate a control of a hydrogen refueling system that reduces the number of start/stops of the compressor and optimise the control of the hydrogen refueling station as such including reducing the power consumption and at the same time facilitates fast and secure refueling.

The invention relates to a system for control of a hydrogen refueling station, the hydrogen refueling station comprise components including a controller, a cooling system and a compressor fluidly connected to a supply storage and a dispenser, the supply storage comprise a plurality of vessels, wherein the controller facilitates control of the position of the valves in the fluid connections between supply storage and dispenser and thereby control of the flow of hydrogen gas from the supply storage to a vehicle tank, when a vehicle is connected to the dispenser, wherein the control of the hydrogen refueling station is optimized according to a high frequency tank profile in a time period between time A and time B, the high frequency tank profile includes selecting a first of the plurality of vessels as supply to the compressor during at least part of the refueling of the vehicle tank, the selection is based on pressure of hydrogen gas in one or more vessels of the supply storage, wherein the control of the hydrogen refueling station is optimized according to a low frequency tank profile in a time period between time C and time D, the low frequency tank profile includes preparing one or more hydrogen refueling station components to enable a plurality of vehicle tank refuelings in the subsequent time period between time A and time B.

The high frequency tank profile is developed to be used in time periods where a plurality of vehicles is expected to be refueled. This time period is defined as the period between time A and time B and is also referred to as rush hour i.e. typically two such periods A-B is defined per day, namely before midday where vehicle drivers are on their way to work and after midday where vehicle drivers are on their way home from work.

The low frequency tank profile is developed to be used in time periods where few vehicles are expected to be refueled. This time period is defined as the period between time C and time D and typically, during 24 hours two such periods C-D occurs. Examples could be between rush hours and during night time.

The above system is advantageous in that it has the effect, that the overall daily (24 hour) control of the hydrogen refueling station is optimized in relation to energy consumption in the preparing of components such as cooling system and supply storage to comply with demands during high frequency periods can be made e.g. during the night time where energy typically is cheap.

The supply storage preferably includes a plurality of vessels and at least two. Having at least three individual vessels (also referred to as supply storages) is advantageous in that it has the effect, that different pressures can be established in the individual vessels including completely full or completely empty.

According to an embodiment, the low frequency tank profile includes selecting a first of the plurality of vessels having a pressure lower than a second of the plurality of vessels and perform a reload of hydrogen gas into the second vessel from the first vessel. This is advantages in that it has the effect, that in this way high/desired inlet pressure to the compressor at the beginning of a high frequency period is facilitated from the second vessel. Further, dump off from external source (supplying hydrogen from trailer/generating hydrogen by electrolysis e.g. on site) to the station can be made more effective the lower pressure/less hydrogen present in the supply storage to be filled from the external source.

Reload of pressure is an expression used for the operation of moving hydrogen gas from one storage to another, typically from a storage having a lower pressure to a storage having a higher pressure than the low pressure.

A hydrogen refueling station operates 24 hours a day and naturally during day time the number of refuelings is higher than during night time. When this use pattern is established, the operation of the hydrogen refueling station can be optimized in that during periods with a low frequency of refuelings (between time C and time D) reload of pressure can be established to ensure as high inlet pressure to the compressor as possible when most needed i.e. during periods with a high frequency of refuelings (between time A and time B).

It should be mentioned that the hydrogen refueling station from time to time requires service and maintenance, inspections, etc. during time periods which may also include time for delivery of gas, the compressor may be required to be stopped to comply with safety standards etc.

According to an embodiment, the cooling system includes a cooling bank, and wherein the low frequency tank profile includes optimizing the cooling capacity of the cooling bank. This is advantageous in that it has the effect, that cooling capacity is increased preferably to its maximum before a high frequency period starts. A cooling bank may be implemented as a solid-state refrigerant of the cooling system, solid state of fluid that is cooled to its solid state by the cooling system, a block of e.g. aluminum etc.

According to an embodiment, the high frequency tank profile and the low frequency tank profile are mutually optimized to facilitate continuous operation of the compressor during a time period from time A to time D.

Running the compressor 24 hours a day i.e. during two high and two low frequency tank profiles is advantageous in that it has the effect, that the above system enables continuous operation of the compressor i.e. preferably operation with no start/stop of the compressor (start/stop is known as part of the operation of a compressor which wears the most). Thereby the system ensures optimal operation conditions for the compressor which instead of stopping the compressor are controlling the compressor to run at low speed. Where the low speed is determined based on analysis of past refuelings, pressure available in the storages, time to next delivery, energy price, etc.

The mutual optimization should be understood such that the control of the compressor during time period A to B is made at least partly based on the expected control of the compressor in the subsequent time period between time C and time D. Further, the control of the compressor during time period C to D is made at least partly based on the expected control of the compressor in the subsequent time period between time A and time B, typically the later will result in a preparation of pressure in supply storages to enable full capacity of the station.

According to an embodiment, the optimized control according to the low frequency tank profile includes continuing reload of hydrogen gas from a first vessel to a second vessel of the second supply storage until a low-pressure threshold of the first vessel or a high-pressure threshold of the vessel is reached.

This is advantageous in that it has the effect, that stopping at a low-pressure threshold of a first vessel ensures that this supply storage e.g. is as empty as (pre)determined by the low-pressure threshold. Further, stopping at the high-pressure threshold of the second vessel ensures that this vessel e.g. is as full as (pre)determined by the high-pressure threshold.

According to an embodiment, the optimized control according to the high frequency tank profile simultaneously to refueling of a vehicle enables the compressor to reload a vessel of the supply storage or the cooling system to rebuild a cooling bank.

This is advantageous in that it has the effect, that an increased capacity of the compressor or cooling system can be exploited in that part of the capacity can be used to refuel the vehicle while simultaneously reloading a supply storage and/or rebuilding a cooling bank.

According to an embodiment, the controller determines at least one of time A, time B, time C and time D based on information of past refuelings. This is advantages in that it has the effect, that the time periods are determined based on actual use of the hydrogen refueling station which may vary from station to station e.g. due to size and diversity of fleet of cars, trucks and busses refueled at the station. Hence by adaptive determination of the time periods A-B and C-D control of the compressor can be optimized with respect to energy consumption, noise, capacity (pressure) of the supply storage, temperature (ambient or component), etc. as will be described below.

According to an embodiment, a time period of 24 hours includes two high frequency periods where the compressor control is optimized to the high frequency tank profile. This is advantageous in that typically there is a high frequency of refuelings of vehicles in the morning where people are on their way to work and in the afternoon where people are on their way home from work. Hence the effect of having two so-called rush hour periods (time period between time A and time B) during 24 hours is that the control of the compressor/station is optimized to comply with the higher demand during these periods.

According to an embodiment, a time period of 24 hours includes two low frequency periods where the control of the compressor and/or the control of the cooling system is optimized to the low frequency tank profile. One of the low frequency periods is preferably found between the two rush hour periods i.e. when people are working. Another is preferably found at night when people are sleeping.

According to an embodiment, the energy consumption of the compressor per minute is higher when performing reload of pressure during a time period between time C1 and time D1 compared to reload of pressure performed in a time period between time C2 and time D2.

The time period having the highest energy consumption is likely to be between time C1 and time D1 i.e. during the middle of the day. Here preparation for the next rush hour is prioritized over cost of energy, hence to perform the reload of pressure the compressor is operated at higher speed (compared to reload during time C2 and time D2).

Opposite is the priority during time period between time C2 and D2 i.e. during night time. Here energy is typically cheap and there is plenty of time to perform the reload of pressure, so during this period, the compressor can be operated a lower speed (compared to reload during time C1 and D1) for a long period of time.

According to an embodiment, the optimized control in the timer period between time A and time B further includes reload of pressure if in this time period no vehicle is connected to the dispenser. This is advantages in that pressure in at least one of the plurality of vessels of the supply storage is increased, this has the effect that a higher inlet pressure to the compressor is facilitated when this particular supply storage is used for a subsequent refueling of a vehicle tank.

Further this is advantageous in that pressure and thereby amount of hydrogen in another of the plurality of supply storages is decreased, this has the effect that the particular supply storage is (preferably completely) empty leading to a more efficient delivery of gas to the particular supply storage or replacement hereof "empty" should be balanced between cost of reload contra cost of leaving a remaining quantity of gas in the storage. Leaving a quantity of gas in a storage is more expensive if the storage is swapped than if it is refilled from delivery from e.g. a truck trailer.

Further, during this period rebuilt of cooling bank is also made if capacity of the cooling system is available.

According to an embodiment, the optimized control in the timer period between time A and time B further includes changing inlet pressure to the compressor by closing a valve associated with a first vessel of the supply storage thereby stopping flow of hydrogen from the first vessel to the compressor and opening a valve associated with a second vessel of the supply storage of the plurality of vessels of the supply storage thereby allowing flow of hydrogen from the second vessel to the compressor, wherein the change of inlet pressure is made when the pressure of hydrogen in the second vessel is higher than the pressure of hydrogen in the first vessel.

This is advantageous in that it has the effect, that the inlet pressure can be as high as possible for as long time of the refueling as possible thereby reducing energy consumption, load/wear and or noise of/from the compressor.

According to an embodiment, the change of inlet pressure is performed when the difference between pressure of hydrogen in the first vessel and in the second vessel reaches a determined vessel shift threshold.

It should be mentioned that during a refueling the inlet pressure and thereby supply storages supplying the compressor (or directly the vehicle tank) can be changed a plurality of times. However, to reduce time for a refueling it is preferred that the threshold value is determined so as to ensure only one or two changes of supply storages during a refueling.

According to an embodiment, the vessel shift threshold is between 100 and 500 bar, preferably between 200 and 400 bar, most preferably between 250 and 350 bar. This is advantages in that it has the effect, that the inlet pressure remains equal to the pressure of hydrogen in the first vessel of the supply storage for a period of time thereby the number of changes of supply storage vessel during a refueling can be controlled (either prior to or during the refueling).

According to an embodiment, the optimized control in the timer period between time A and time B further includes controlling the compressor to operate at a capacity above 100% of its rated capacity. This may be done by providing the electric motor driving the compressor with a voltage having a frequency above the motor's nominal frequency e.g. via a frequency converter. This is advantages in that it has the effect, that duration of a refueling of a vehicle can be reduced and capacity of the hydrogen refueling station can be increased.

According to an embodiment, the compressor is continuously operating above 100% of its rated capacity for maximum 20 minutes, preferably maximum 10 minutes, most preferably maximum 5 minutes.

According to an embodiment, the optimized control in the time period between time A and time B further includes that during refueling of the vehicle the operation speed of the compressor is varied.

According to an embodiment, the operation speed of the compressor is reduced in the second half of the refueling. This is advantageous in that it has the effect, that a throttle valve can be avoided in the flow path between the supply storage used and the dispenser.

Further, it has the effect that the flow of hydrogen when the refueling is terminated is low and thereby a gentler termination of the flow can be obtained at the end of the refueling. Typically, the operation speed of the compressor is reduced the last third, preferably the last fourth most preferably the last fifth of the refueling.

According to an embodiment, the optimized control in the time period between time C and time D further includes stopping the reload from a first vessel of the supply storage when a low pressure reload threshold is reached. This is advantageous in that it has the effect that the delivery of hydrogen to an empty tank (first supply storage vessel) can be done more effective i.e. more hydrogen can be moved from the truck trailer to the first supply storage if the latter is empty. In the situation where the supply storage is replaced, the advantage in replacing an (completely) empty versus a storage which is not completely empty is obvious.

According to an embodiment, after reaching the low-pressure threshold of the first vessel of the supply storage, the reload of pressure of a second vessel of the supply storage continues by moving hydrogen gas from a third vessel of the supply storage having a pressure lower than the pressure of the second vessel either until a high reload pressure threshold is reached of the second vessel or a low reload pressure threshold of the third vessel is reached.

Preferably, the high reload pressure threshold equals the rated pressure for the second vessel of the supply storage. This is advantageous in that it has the effect, that the second vessel is then filled up to rated pressure and thereby there is no need for delivery of hydrogen from a truck trailer which reduced time of the complete delivery.

According to an embodiment, the operation speed of the compressor is increased between time C and time D if a vehicle is attached to the dispenser.

Attaching a vehicle to the dispenser indicates an imminent refueling. A signal indicating such upcoming refueling, can be used as an input to the controller to initiate preparation for the upcoming refueling. Such preparations could be increasing compressor speed e.g. to increase pressure in a supply storage, facilitate direct filling from a low-pressure supply storage via the compressor or simply reach a desired operation speed faster than if the compressor speed starts to be increased when a start bottom is pushed. Further, it could be starting up cooling system and start cooling of the fluid connection to the dispenser.

According to an embodiment, an early detection of the vehicle approaching the dispenser is provided. An early detection is advantages in that it has the effect that, the compressor may be started, or its speed may be increased, the cooling system may be started, etc. The early detection may be facilitated by means of a sensor sensing movements.

According to an embodiment, the controller is controlling the operation speed of the compressor during based on a control strategy takin into account at least one of the lists comprising: Noise reduction, Energy consumption, Cost of energy, Time until next expected time A, time B, time C and/or time D, Time until next delivery of gas, Ambient temperature and Refueling.

The noise reduction control strategy is advantages in that it has the effect that the noise generated from operation of the compressor is reduced. This can be obtained by reducing speed of the compressor. Noise reduction control strategy sometimes indirectly specifies an upper limit for the compressor speed in that local requirements to noise may provide an upper nose limit and thereby an upper speed limit. Typically, it is allowed to generate more noise during day time than during night time, accordingly time of the day may also influence the choice of noise reduction control strategy.

The energy consumption control strategy is advantages in that sometimes e.g. wind turbines are producing more energy than what is needed in the utility grid, in such situation the compressor speed can be increased to perform faster reload of pressure using more of the available energy The cost of energy control strategy is advantages in that based on this strategy the reload of pressure can be made e.g. during night time where cost of energy typically is cheaper that during day time.

Time until next expected time A, B, C or D control strategy is advantages in that compressor speed can be increased and thereby more gas can be moved from one supply storage to another during reload of pressure. This has the effect, that one or more supply storages can be at or close to rated pressure, thereby the inlet pressure to the compressor during the future refueling is increased leading to a less energy consuming refueling.

Time until next delivery of gas control strategy is advantages in that the compressor speed can be controlled so as to be as low as possible and at the same time ensure that at the time of delivery, at least one supply storage is empty. This has the effect, that more hydrogen can be moved from the truck trailer to the supply storage during the delivery.

Delivery of gas is a term used to define the action of supplying gas to the hydrogen refueling station. Delivery may therefore include supply from a pipeline, onsite electrolysis, swap or replace non-permanent storages and in refuel permanent storages Refueling control strategy is advantages in that if there is not sufficient pressure in any of the supply storages to perform a refueling, the compressor speed can be increased and thereby a refueling can be made directly from the low-pressure supply storage.

Accordingly, the different control strategies can be combined to facilitate the cheapest, fastest, most efficient, etc. operation of the compressor and thereby of the hydrogen refueling station. Preferably, the pressure in at least one of the supply storage, energy price and/or time to next expected refueling and/or delivery is included to choose the optimal control strategy.

A further effect of the above control strategies is that the compressor is preferably always running which is important since wear of a compressor is high especially during start and stop of the compressor.

According to an embodiment, the controller facilitates performing an estimation of a sufficient size of the supply storage based on average operation speed of the compressor. This is advantageous in that it has the effect, that a notice from the controller to an operator can be established indicating that by adding an additional supply storage to hydrogen refueling station, the average operation speed of the compressor can be reduced and thereby to operation cost of the hydrogen refueling station can be reduced.

Wherein one of the vessels of the supply storages is a non-permanent vessel. A non-permanent vessel could be part of a truck trailer, container, or the like. Such trailer, container or the like may include a plurality of individual vessels. In fact, the entire supply storage can be non-permanent. Non-permanent supply storages are advantages in that delivery of gas can be done much faster than transferring gas from e.g. a trailer to a permanent supply storage.

According to an embodiment, one of the vessels of the supply storages is a permanent vessel. A permanent vessel could be an integrated part of the hydrogen refueling station. Permanent vessels are advantages where footprint of the hydrogen refueling station or local regulations do not allow e.g. a truck trailer to be parked.

According to an embodiment, one of the supply storages is defined as a fueling storage. Defining one of the supply storages as fueling storage is advantages in that control software then can used this particular storage as fueling storages i.e. keeping the pressure hereof higher than in the other supply storages. Preferably above 700 bar so that at least part of the refueling of a vehicle can be made directly from the fueling storage. This is advantages in that it has the effect when fueling directly from the fueling storages, this will not require high speed operation of the compressor.

Having a plurality of supply storages and one or more fueling storages is advantages in that it has the effect, that hydrogen at a pressure above 750 bar can be stored in a fueling storage. This facilitates performing a 350 bar or even 700 bar refueling directly from the fueling storage. Further it has the effect, that flexibility is added to the reload of pressure in that if time, energy prices, etc. is right reload of pressure can include increasing pressure both in the high-pressure fueling storage an in the medium pressure supply storages.

Moreover, the invention relates to a method of controlling a hydrogen refueling station, the hydrogen refueling station comprise components including a controller, a cooling system and a compressor fluidly connected to a supply storage and a dispenser, the supply storage comprise a plurality of vessels, the method comprising the steps of: controlling the hydrogen refueling station according to a high frequency tank profile in a time period between time A and time B, the high frequency tank profile includes selecting a first of the plurality of vessels having a pressure higher than a second of the plurality of vessels as input vessel to the compressor during at least part of the refueling of a vehicle, controlling the hydrogen refueling station according to a low frequency tank profile in a time period between time C and time D, the low frequency tank profile comprise at least one of the steps of selecting a first of the plurality of vessels having a pressure lower than a second of the plurality of vessels and perform a reload of hydrogen gas into the second vessel from the first vessel or increasing the cooling capacity of a cooling bank of a cooling system.

Preferably the selection and comparison of pressure of gas in the vessels are made by the controller receiving pressure and may be also temperature information from pressure and/or temperature sensors.

THE DRAWINGS

For a more complete understanding of this disclosure, reference is now made to the following brief description, taken in connection with the accompanying drawings and detailed description, wherein like reference numerals represent like parts:

DETAILED DESCRIPTION

Figure 1:
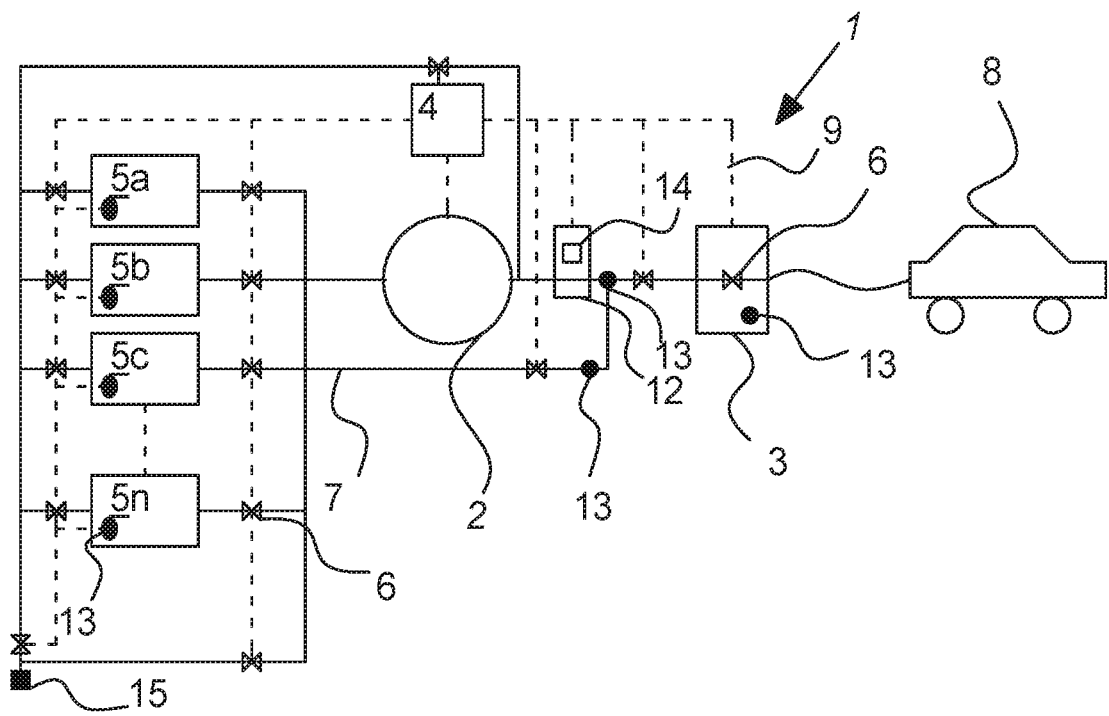
FIG. 1 illustrates a hydrogen refueling station

FIG. 1 illustrates an example of a hydrogen refueling station (HRS; Hydrogen Refueling Station) 1 according to the invention. The HRS 1 comprise a compressor 2, a dispenser 3, a controller 4, a supply storages 5 comprising a plurality of vessels (5a, 5b, 5c, . . . , 5n) and a cooling system 12. It should be mentioned, that the station 1 illustrated on FIG. 1 is only one example of such station. As long as there are at least two supply storages 5, a compressor 2 and a dispenser 3 any configuration of gas flow paths from supply storage 5 to dispenser can be referred to as a station 1 with respect to the present invention.

The flow of hydrogen gas is preferably controlled by the controller 4 from the upstream supply storage 5 via valves 6 and fluid connection 7 downstream to the cooling system 12 and dispenser 3 to finally arrive at the vehicle 8. The flow of hydrogen may be controlled either through or bypassing the compressor 2, in both cases flow from a supply storage 5 to a vehicle 8 is referred to as a refueling. It is noted that FIG. 1 illustrates a plurality of valves 6, but to simplify the figure only a few reference numbers to these valves 6 is illustrated.

Further, flow of hydrogen gas may also be controlled from a first vessel of the supply storages to a second vessel of the supply storages 5 either through or bypassing the compressor 2. These ways of reducing pressure in one vessel of the supply storage 5 to increase pressure in another vessel of the supply storage 5 are referred to reload of pressure (in a supply storage).

Preferably the control of the compressor 2 is flexible i.e. the capacity of the compressor 2 is controlled depending on demand (real-time or future) of amount and or pressure of hydrogen gas.

Flexible control of the compressor 2 can be obtained by adjusting the pressure of the supply storage 5 i.e. the inlet pressure of the compressor. A further parameter adding flexibility to the compressor control is the possibility of adjusting the compressor speed which is typically measured in revolutions per minute (RPM; Revolution Per Minute).

The change of operation speed of the compressor 2 is preferably made by changing frequency of the voltage supply to the electric motor (not illustrated) driving the movable part (e.g. piston, not illustrated) of the compressor 2. This is preferably done by a frequency converter (not illustrated) so that when supplying voltage at nominal motor frequency to the motor, the compressor is operated at rated speed/capacity. Below the nominal frequency the operation speed is below the rated speed and above the nominal frequency the operation speed is above the rated speed. The exact level of the rated speed is determined by the design and choice of motor, compressor, etc.

If a vehicle 8 is refueled from one and the same vessel of the supply storage 5 without making use of the compressor 2, the quantity and pressure of hydrogen gas in this vessel will be reduced and pressure equalization between the vessel and the vehicle tank will happen over time. Therefore, when pressure equalization is reached, the refueling can continue by shifting supply to the vehicle tank i.e. establish flow of hydrogen gas from another vessel having a higher pressure than the first. Such refueling without compressor will end when pressure equalization between the vessel of the supply storage 5 having the highest pressure and the vehicle tank is established.

Typically, a refueling is conducted either by use of the compressor 2 during the entire refueling or in combination with refueling from one or more vessels of the supply storage 5.

After a refueling where pressure is reduced in the supply storage 5, the inlet pressure to the compressor for the subsequent refueling is reduced leading to a less flexible compressor control for this subsequent refueling. This is at least true for the flexibility depending on the inlet pressure.

To an extent, the reduction in flexibility can be avoided or postponed in time by using, more than one of the vessels of the supply storages 5 to the compressor 2. Therefore, during a refueling one or more supply storage shifts are made to obtain a pressure in the supply storages within preferred upper and lower pressure limits.

Accordingly, it is desired to have as high pressure in the supply storages 5 as possible. Therefore, at least when the compressor 2 is not used in the refueling a vehicle 8, it can be used to move hydrogen gas from one vessel to another vessel of the supply storage 5. This moving of gas is in this document referred to as reload of gas.

The flow of gas needed for the reload of gas and the refueling of vehicle 8 is preferably controlled by a single controller 4 which transmits control and measuring signals to and from valves 6, sensors 13 (pressure, temperature), compressor 2, dispenser 3, etc. To illustrate the communication of control signals (including wireless) are illustrated by dotted line 9 on FIG. 1, knowing that the control system of a HRS 1 is far more complex that what is illustrated. The measuring of flow, pressure and temperature in a HRS 1 is considered known by the skilled person and therefore not described in further details.

The cooling system 12 preferably comprises a cooling bank 14 in the form of an element that can be cooled down to a given temperature and preferably kept at this temperature. Such element can be a block of aluminum or other metals, it may be solid state refrigerant of the cooling system 12 or some fluid that is solidified by the cooling system 12. The establishing of a cooling bank 14 is preferably made during a low frequency period 11, which is advantages in that during a subsequent high frequency period 10, the cooling capacity of the HRS 1 is higher than that of HRS 1 having cooling systems without a cooling bank 14. The control of the cooling system 12 optimised according to a low and high frequency tank profile has the same advantages as control of the compressor 2, the control according to a low and high frequency tank profile.

The cooling system 12 is preferably a cooling as described in WO2016180425 hereby incorporated by reference.

Reload of gas, refueling of vehicle tank, building of cooling bank 14 and thereby control of the compressor 2 is preferably controlled according to load pattern of the HRS 1. An example of a typical load pattern of a HRS 1 for a 24 hour period on a working day is illustrated on FIG. 2. The load pattern may vary a lot between different geographic locations, working days, holidays, weekends, if special events are arranged in the area of the HRS 1, etc.

As noted, FIG. 1 includes a hydrogen supply connection 15. This connection point is used to supply hydrogen to the supply storage 5. As mentioned the supply storage 5 can be implemented as a removable storage e.g. in the form of a tube trailer(s) or container(s) which are intended to be replaced when empty or stationary storage i.e. vessels located above or below ground not intended to be moved when empty. The connection point 15 can also be supplied from an electrolysis apparatus located external to or as part of the HRS 1.

Figure 2:
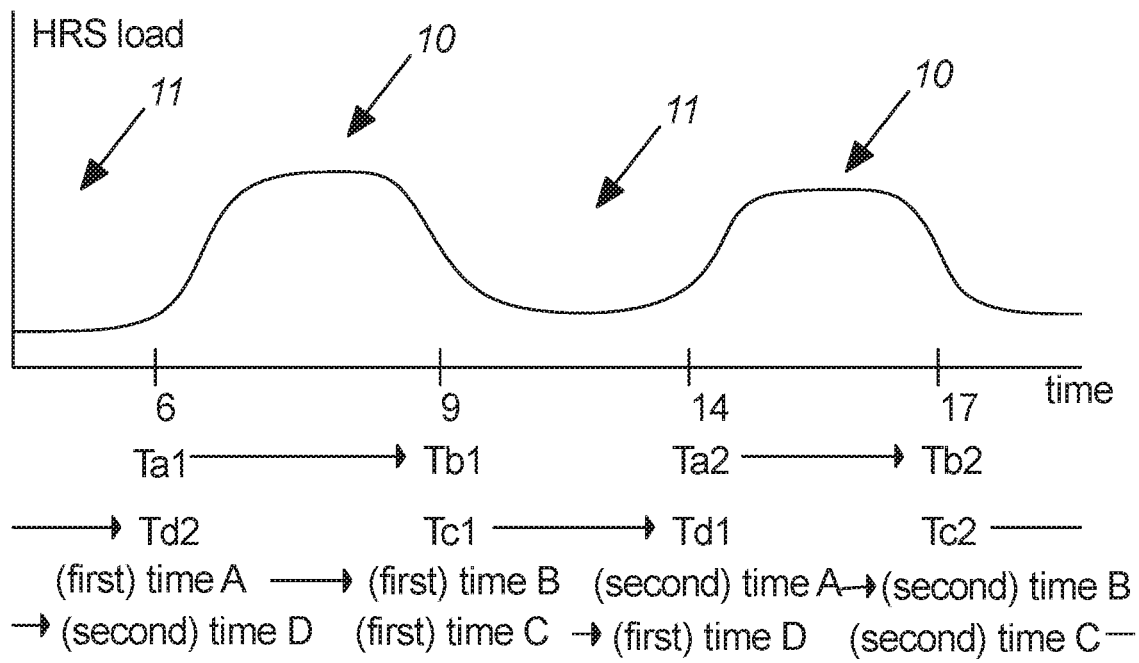
FIG. 2 illustrates a load pattern of a hydrogen refueling station over time.

On the timeline of FIG. 2 rush hours are illustrated between 6 in and 9 in the morning and again between 14 and 17 in the afternoon. Thurs, with reference to this particular nonlimiting example, at 6 in the morning a high frequency profile starts (i.e. at 6 a first time A is defined, referred to Ta1) and at 9 in the morning it ends (i.e. at 9 a first time B is defined, referred to as Tb1). In the same way, at 9 in the morning, a low frequency profile starts (i.e. at 9 a first time C is defined, referred to as Tc1) and at 14 in the afternoon it ends (i.e. at 14 a first time D is defined, referred to as Td1). The same definitions of start and stop of time periods are made with reference the second rush hour (second time A/Ta2–second time B/Tb2) and second low activity period (second time C/Tc2–second time D/Td2).

Accordingly, it is noted that in the illustrated example the time of day where rush hour end and low activity period begins e.g. at first time B and first time C at 9 in the morning are referred to as both first time B and first time C. These first/second times A, B, C and D are in the this document simply referred to as time A, B, C and D.

In the embodiment of the removable supply storage, the supply storage 5 is moved to hydrogen supply plant i.e. a larger plant storage or an electrolyer where the vessels 5a, 5b, 5c, 5n are filled up with hydrogen. Such hydrogen supply plant may receive a plurality of movable supply storages which needs to the filled up and returned to the hydrogen refueling stations 1.

The control of this filling up of movable supply storages can be made similar to the reload of pressure described in relation to the supply storage 5 of the HRS 1. Even though the filling of the movable supply storages can be planned to a greater extent than refueling of vehicles, there will still be high frequency and low frequency periods at the hydrogen supply plant. Even if this is not the case, the considerations of energy consumption, energy price, etc. are also relevant to consider both in relation to produce the hydrogen but at least in relation to filling the movable supply storage.

An example of a high frequency period could be the hours prior to truck drivers are to pick up the trailers. During such period, the compressor of the hydrogen supply plant is to be controlled so as to ensure all trailers are filled with hydrogen at the end of the period.

The load pattern on the example illustrated on FIG. 2 illustrates two periods of high frequency of refuelings 10 and two periods of low frequency of refuelings 11. It should be mentioned, that as illustrated time A1 and time D2, time B1 and time C1, time A2 and time D1 and time B2 and time C2 respectively may be the same points in time.

The high frequency periods are found between time A1 and time B1 and again between time A2 and time B2. From the time indications of the x axis, the high frequency refueling are in this example between 6 and 9 in the morning and again between 14 and 17 in the afternoon. In these periods, most people are driving to and from work and are likely to refuel their vehicles leading to a high frequency of refuelings at the HRS 1.

The low frequency periods 11 are in this example found between time C1 and time D1 and again between time T2 and time D2 i.e. in between the high frequency periods 10. Hence typically the low frequency periods 11 are found to be around midday and during evening/night time.

The high and low frequency periods 10, 11 can be defined by time of day, expectations to the number and distributions of refueling of the HRS 1. The value of control parameters of the software of the controller 4 can then be determined based on these expectations. It should be mentioned, that the load pattern may vary from one day to the next and from season to season.

Another and preferred way of defining the high and low frequency periods 10, 11 is to analyze refuelings made at the HRS 1 after a period of time of operation of the HRS 1. Such period could cover one or more months where data of refueling are stored and analyzed. The data used for such analysis may include number of refuelings, timestamp of each refueling, amount of hydrogen gas delivered to the vehicle, time it took to conduct the refueling, energy consumption, etc. Data acquisition and the analysis (including averaging or normalizing of data) hereof may be continuously updated from day to day or from week to week.

An example of analysis of the above-mentioned data is determining amount of gas delivered to vehicles over a period of time of e.g. 15 minutes at a specific week day (preferably all 24 hours of that day, length of periods is preferably between 1 and 120 minutes). Based on a comparison of deliveries during in this example 96 15 minutes periods the cut between the high and low frequency periods can be made. If the amount within a 15-minute period is above a threshold value, the period is part of a high frequency period 10. When the load of the HRS 1 has been analyzed over a period of e.g. 24 hours, the high frequency periods 10 can be defined. When having defined the high frequency periods 10, the low frequency periods 11 may simply be defined as the periods between the high frequency periods 10.

The value of the threshold between high and low frequency periods can be determined based on the relative difference between amounts delivered and/or energy consumption and/or available amount of gas in the supply storages in the 15 minutes periods of the above example.

Accordingly, now the control of the compressor 2 and cooling system 12 can be made intelligent e.g. based on expected future needs. The overall control strategy of the high frequency period 10 is obviously to ensure fast refueling and with any available capacity of compressor 2 increase pressure in the supply storage 5. During this period of time, the compressor 2 and cooling system 12 are controlled according to a so-called high frequency tank profile. The overall control strategy of the low frequency period 11 is to perform pressure reload of vessels of the supply storages 5, built cooling bank 14 of the cooling system 12 and to avoid too many start/stop sequences of the compressor 2. During this period of time the compressor 2 and the cooling system 12 is controlled according to a so-called low frequency tank profile.

The main object of the high frequency tank profile is to facilitate as many refueling as fast as possible. This may include using the compressor to increase pressure from a storage supply 5 and move it to a vehicle tank. Further, it may include operating the compressor 2 to increase the pressure in one vessel of the supply storage 5 at the expense of another one of the vessels of the supply storages 5. Further, it may include operating the cooling system 12 to try to maintain the cooling bank 14 and/or cool the hydrogen gas as its flow towards the dispenser 3. Further and preferably, it may include a combination hereof.

The high frequency tank profile may be subject to local restrictions such as a maximum (or minimum) power consumption (within a given period of time), maximum noise emission and the like. Therefore, even if compressor/cooling capacity is available, it may not be utilities e.g. due to noise restrictions.

On the other hand, the compressor 2 may be operated above its maximum rated capacity (/speed) for a period of time. By having a compressor 2 that is able to be operated in this way, the peak capacity of the HRS 1 is increased thereby allowing to reduce the size or number of supply storages 5. Alternatively, the size of the compressor 2 can be reduce if it is possible to operated it above its rated capacity for a period of time. Both of these alternatives are leading to a reduced cost of capacity of the HRS 1 in that the capacity of the one or more supply storages 5 can be reduce while maintaining the overall capacity of the HRS 1.

The ability of varying the capacity of the compressor 2 is facilitated by providing as high inlet pressure to the compressor as possible and/or by increase the operating speed of the compressor.

The first, i.e. facilitate high inlet pressure, is obtained by ensuring high pressure in the supply storages. This can be obtained by ensuring timely replenishing of the individual storages 5 and perform pressure reload in-between refueling in the high frequency period 10 and/or during the low frequency period 11.

The latter, i.e. varying the operation speed of the compressor is done depending on the type of compressor 2. In the case the compressor is driven by an electric motor, the operation speed can be controlled by regulating the frequency of the voltage supplied to the compressor 2. Hence, what in this document is referred to as rated capacity of the compressor is obtained at a nominal frequency of the motor driving the compressor. Accordingly, a 50 Hz motor operates the compressor at rated speed or capacity when supplied with a voltage having a frequency of 50 Hz. Likewise, a 60 Hz motor operates the compressor at rated speed or capacity when supplied with a voltage having a frequency of 60 Hz. The speed of the compressor refers to frequency of movement of the diaphragm in a diaphragm compressor or piston cycles.

The varying of the operation speed i.e. in this example adjusting the frequency of voltage to the motor driving the compressor may include controlling the compressor above (and below) its rated capacity for a period of time i.e. the frequency to the motor is above (or below) 50 Hz/60 Hz for a 50 Hz/60 Hz motor.

According to an embodiment, it may be possible to increase the operation speed to a speed of up to and above 900 rmp (of piston in the compressor) for a limited period of time less than 10 minutes. This however requires a special type of compressor 2. Such compressor 2 is preferably a diaphragm compressor as described in WO2016184468, hereby incorporated by reference.

Operating the compressor above rated capacity is advantages in that it has the effect that this increases the capacity of the HRS 1 i.e. with the same supply storage the HRS 1 is able to deliver hydrogen gas with a higher pressure than a HRS 1 having a compressor only capable to operate its compressor at rated capacity. Further it has the effect that the refueling time (and time of reload of pressure in the supply storage) can be reduced due to the higher pressure with is possible to establish. Despite the higher level of noise and energy consumption, this is desirable when there is a current need for the compressor to deliver high pressure.

The operation of the compressor 2 below rated capacity i.e. with voltage supplied to the motor driving the compressor below nominal frequency of the motor is of course also possible. However, this is mainly used under control in the low frequency periods as will be described below. Advantages of operating the compressor below rated capacity includes at least lower energy consumption and low noise emission. This is desirable when there is no current need for the compressor to deliver high pressure.

When mentioning the compressor in this document preferably a reference is made to a diaphragm compressor. The diaphragm compressor may be of the type having an elongated or oblong shaped compression chamber. However, it should be mentioned, that other types of compressors could be used and also these other types may be controlled above or below their rated capacity. Other types of compressors such as ionic-liquid and piston compressors could be used.

Further it should be mentioned, that the compressor may be a multi stage compressor preferably with at least two stages. This is advantages in that the compressor is able to perform a first compression of gas to a first stage to a first pressure and a subsequently compression of gas at a second stage to a second pressure and thereby increase efficiency of the high-pressure compressor.

The high frequency tank profile is therefore often developed to, or by means of control parameters of the control software of the controller 4 of the HRS 1 adjusted to, operated optimal at a specific site. Especially with respect to requirements to amount and temperature of gas that has to be delivered and noise made and energy used in the high frequency periods. Therefore, the high frequency tank profile is developed as a tradeoff between capacity in the vessels of the supply storage 5, cooling capacity of the cooling system 12, local requirements and required amount of hydrogen gas delivered to the users of the HRS 1 which typically would be vehicle owners.

The main object of the low frequency tank profile is to facilitate reload of the supply storage 5 and rebuilt of cooling bank 14 as efficient as possible to be ready for the refueling of hydrogen of the following high frequency period. A secondary object can be to keep the compressor running continuously. Another secondary object can be to use excess energy of the utility grid and convert it to pressurized hydrogen gas in the supply storage of the HRS 1.

As with the high frequency tank profile, the low frequency tank profile may also be subject to local requirements especial when used at night time. One example could be if the HRS 1 is located inside a city limit, then restrictions to noise would be expected at least during night time.

The reload of supply storage and/or establishing of cooling bank 14 during the low frequency tank profile is preferably controlled by adjusting parameters of the control software executed by the controller 4 and/or based on analysis of amount of hydrogen available in the individual supply storages 5, remaining time of the low frequency period, etc. This is leading to an operation speed of the compressor 2 which is lower than during the high frequency period.

The result of an optimized control of the compressor 2 and/or cooling system 12 during the low frequency period, is that the end of this period (the beginning of the subsequent high frequency period) the pressure of the vessels of the supply storage 5 are as desired, the cooling capacity of the cooling bank 14 is as desired (preferably maximum) and that this is obtained with as little energy consumption from the compressor 2 and/or cooling system 12 as possible.

Accordingly, optimized control during a period i.e. the high or low frequency tank profiles control strategies should be understood as control preparing components of the HRS 1 to the subsequent time period where the control of the HRS 1 is made with reference to the opposite control strategy. This includes as mentioned increasing/lowering pressure in a supply storage as fast/energy efficient as possible, built up cooling capacity, etc.

Desired pressure of the supply storages 5 at the end of the low frequency period to facilitate refuelings is preferably between 0 and 1000 bar. For vessels of the supply storage ready to be used as supply to the compressor for refueling the pressure of the vessels may be from 100 to 1000 bar (with intervals between of 50 bar), preferably 200, 350, 450, 500 and 950 bar. For vessels for the supply storage ready to be refilled or swapped the pressure may be below 100 bar, preferably below 50 bar.

The analysis of need of pressure and/or cooling capacity is preferably updated if during the low frequency period a refueling is made. Such refueling reduced the pressure of the supply storages 5 and therefore the speed of the compressor needs to be updated (increased) to end at the desired pressure of the supply storage 5 at the end of the low frequency period.

It is preferred that the compressor do not stop during the low frequency period (nor during the high frequency period) in that typically compressors are design for continuous operation opposite to a plurality of start/stops. However, stopping and subsequently starting the compressor 2 is possible, however not desired.

It should be mentioned that operation during the low frequency period between time B1 and time D1, the operation speed is higher than in the low frequency period between time C2 and time D2. This is because, the time to nest expected refueling is expected to be shorter between time C1/D1 than between time C2/D2.

For control both according to the high and low frequency tank profile, it is desired to have early detection of a vehicle approaching the HRS 1 to get a refueling. Early detection may be implemented by sensors located at the HRS 1 or close thereby, GPS of vehicle or smartphone of vehicle driver or the like.

The early detection signal can be used to increase speed of the compressor 2 and the operation of the cooling system 12 and thereby ensuring as fast refueling as possible. It is however especially advantages when control is performed according to the low frequency tank profile in that here typically the compressor would operate in relatively low operation speed and hence an increase of speed is needed to use the compressor during the refueling.

For both profiles, the control software may be the same but with different parameters settings. The parameter setting may relate to one or more of the lists comprising: Noise reduction, temperature (ambient or of a component), Energy consumption, Cost of energy, Time until next expected refueling, Time until next expected time A, time B, time C and/or time D, Time until next delivery, and/or Pressure in one for the plurality of supply storages. Requirements to noise is typically determined locally and depends on if an area is defined as industry or residential if it is day or night. As an example, requirements e.g. for Germany can be found in the so-called TA lärm instruction.

The mutual optimization of the tank profiles should be understood such that the control of the compressor 2 and cooling system 12 during time period A to B (high frequency tank profile) is made at least partly based on the expected control of the compressor 2 and cooling system 12 in the subsequent time period between time C and time D (low frequency tank profile) and vice versa. As an example, could be mentioned, that between refueling in the high frequency tank profile, the compressor 2 can perform reload of a supply storage 5 and the cooling system 12 rebuilt cooling bank 14. The speed of the reload and thereby of the compressor can be determined e.g. by requirements to noise and energy consumption, but also to the length of time remaining in period between time A and B or the time between subsequent time period C to D, the level of hydrogen in the supply storage having the lowest pressure, etc.

Likewise, the control of the compressor during time period time C and time D is preferably controlled either according to a supply storage pressure desired at the beginning of the subsequent time period between time A and time B and/or the time of the day of the next delivery of hydrogen gas. Both are important to have as efficient a HRS control system as possible.

In fact, instead of controlling the compressor 2 according to a specific time for delivery of gas to the HRS, the control system of the HRS 1 is able to estimate when the supply storage is ready to be refilled or swapped (commonly referred to as delivery of hydrogen) and provide this information to a logistics center in charge of refueling of gas at the HRS 1.

It should be mentioned, that it is possible to reduce the compressor speed towards the end of a refueling. By doing so the flow of hydrogen gas is reduce and thereby when finally terminating the flow by closing a valve, the mechanical stress is reduced if the flow is reduced before closing the valve.

It should be mentioned, that it is possible to temporary stop cooling or reduce threshold temperature of flow line 7 between the cooling system 12 and the dispenser 3. The distance here between may be 50 meters or more and when no refuelings are expected (in the low frequency period) energy can be saved on allowing a higher temperature of this line. In relation early warning, this would also be advantages in that desired temperature of the hydrogen gas at the dispenser 3 can be obtained faster if cooling of the line 7 between cooling system 12 and dispenser 3 can be made prior to the vehicle 8 is connected to the dispenser 3.

Reference to a supply storage is made to a plurality of individual vessels or one or more vessels having internal banks facilitating holding hydrogen gas separated at different pressures. The size or number of vessels or banks of a supply storage is determined by the capacity desired for the HRS 1 to have. The higher capacity, the larger supply storage 5.

Typically, the supply storage 5 is refilled from a truck trailer, but a swap of supply storage 5 of the HRS with a prefilled new supply storage 5 is also possible. The latter is advantages in that it reduces time to deliver gas in that the new supply storage is filled at the electrolyser site and not on the HRS site.

The maximum pressures of the vessels of the supply storage 2 may vary from 200 bar to 1000 bar. Typically, only one or two vessels have rated pressure up to or above 1000 bar in that such vessels are more expensive than lower pressure vessels. However, high-pressure vessels are desired in that by having these, fast refueling can be initiated without having the compressor up and running.

As an example, a supply storage 5 of or connected to a HRS 1 may include low, medium and high-pressure vessels. According to such example the supply storage 5 could comprise 20 or more low pressure vessels having a rated pressure between 100 and 300 bar, preferably 200 bar. Further, 20 or more medium pressure vessels having a rated pressure between 300 and 550 bar, preferably 450 bar and further, 20 or more high pressure vessels having a rated pressure between 500 and 1200 bar, preferably 950 bar.

The number and type (1, 2, 3 or 4) of vessels is determined by one or more of the following capacities of the HRS 1, the volume of the individual vessel, maximum footprint of the HRS, etc. Sometimes, medium and high-pressure vessels are referred to as fueling storage.

From the above it is now clear that this document relates to a control of a gas refueling station, preferably a hydrogen gas refueling station. The control is optimized over a period of e.g. 24 hours to be as efficient as possible. Therefore, the time period is divided into one or more high and low frequency periods. In the low frequency periods, the components of the refueling station is prepared for the subsequent high frequency period. This may include establishing reload of pressure in vessels of the supply storage, emptying a vessel of the supply storage 5 and establishing a cooling bank 14 in the cooling system. By doing so in a low frequency period e.g. during night time, it may be done as energy and noise efficient as possible. It is advantages in that during the following high frequency period, the refueling station is as prepared as possible to as efficient as possible handle a plurality of refuelings within a period of a few hours. The definition of low and high frequency periods and how to control compressor and cooling system herein is described above.

Further it is clear, that also when filling movable supply storages at a hydrogen supply plant, the control hereof can be made as the above described reload of supply storage 5 of the HRS 1. Also, it is clear, that from the control of the valves 6 of FIG. 1 flow of hydrogen from supply to the hydrogen supply connection 15 and/or the supply storage 5 to the vehicle and/or to reload of supply storage vessels 5a, 5b, 5c, 5n can be made in many different ways depending on position of the valves.

LIST

1. Hydrogen refueling station
2. Compressor
3. Dispenser
4. Controller
5. Supply storage 6. Valves
7. Fluid connection
8. Vehicle
9. Electric connection
10. High frequency period
11. Low frequency period
12. Cooling system
13. Sensors (pressure and/or temperature)
14. Cooling bank
15. Hydrogen supply connection

The invention claimed is:

1. A system for control of a hydrogen refueling station, the hydrogen refueling station comprises components including a controller, a cooling system and a compressor fluidly connected to a supply storage and a dispenser,
the supply storage comprises a plurality of vessels,
wherein the controller is configured to facilitate control of a positon of a plurality of valves in fluid connections between the supply storage and the dispenser and thereby control of a flow of hydrogen gas from the supply storage to a tank of a vehicle, when the vehicle is connected to the dispenser,
wherein the controller is further configured to optimize the hydrogen refueling station according to a high frequency tank profile in a time period between time A and time B, the high frequency tank profile includes selecting a first of the plurality of vessels as supply to the compressor during at least part of a refueling of the vehicle tank, the selection is based on pressure of hydrogen gas in one or more vessels of the supply storage,
wherein the controller is further configured to optimize the hydrogen refueling station according to a low frequency tank profile in a time period between time C and time D, the low frequency tank profile includes preparing one or more of the hydrogen refueling station components to enable a plurality of vehicle tank refuelings in the subsequent time period between time A and time B,
wherein the controller is further configured to determine the time A and the time B based on analysis of data from past refuelings acquired during a period of time of operation of the hydrogen refueling station, and
wherein the controller is further configured to update the time A and the time B based on analysis of the data from past refuelings.

2. The system according to claim 1, wherein the low frequency tank profile includes selecting a first of the plurality of vessels having a pressure lower than a second of the plurality of vessels and perform a reload of hydrogen gas into the second vessel from the first vessel.

3. The system according to claim 1, wherein the cooling system includes a cooling bank, and wherein the low frequency tank profile includes optimizing the cooling capacity of the cooling bank.

4. The system according to claim 1, wherein the high frequency tank profile and the low frequency tank profile are mutually optimized to facilitate continuous operation of the compressor during a time period from time A to time D.

5. The system according to claim 1, wherein the wherein the controller is further configured to optimize control according to the high frequency tank profile simultaneously to refueling of the vehicle enables the compressor to reload a vessel of the supply storage or the cooling system to rebuild a cooling bank.

6. The system according to claim 1, wherein the controller is further configured to determine at least one of time C and time D based on information of past refuelings.

7. The system according to claim 1, wherein the energy consumption of the compressor per minute is higher when performing reload of pressure during a time period between a time C1 and a time D1 compared to reload of pressure performed in a time period between a time C2 and a time D2.

8. The system according to claim 1, wherein the controller is further configured to optimize control in the timer period between time A and time B further includes changing inlet pressure to the compressor by closing a valve associated with a first vessel of the supply storage thereby stopping flow of hydrogen from the first vessel to the compressor and opening a valve associated with a second vessel of the supply storage of the plurality of vessels of the supply storage thereby allowing flow of hydrogen from the second vessel to the compressor, wherein the change of inlet pressure is made when the pressure of hydrogen in the second vessel is higher than the pressure of hydrogen in the first vessel.

9. The system according to claim 1, wherein the controller is further configured to optimize control in the time period between time A and time B further includes that during refueling of the vehicle the operation speed of the compressor is varied.

10. The system according to claim 1, wherein after reaching a low pressure threshold of the first vessel of the supply storage, the reload of pressure of a second vessel of the supply storage continues by moving hydrogen gas from a third vessel of the supply storage having a pressure lower than the pressure of the second vessel either until a high reload pressure threshold is reached of the second vessel or a low reload pressure threshold of the third vessel is reached.

11. The system according to claim 1, wherein an early detection of the vehicle approaching the dispenser is provided.

12. The system according to claim 1, wherein the controller is controlling the operation speed of the compressor during based on a control strategy taking into account at least one of the list comprising:
Noise reduction,
Energy consumption,
Cost of energy,
Time until next expected time A, time B, time C and/or time D,
Time until next delivery of gas,
Ambient temperature and
Refueling.

13. The system according to claim 1, wherein the controller is further configured to facilitate establishing an indication that an additional supply storage should be added to the supply storage of the hydrogen refueling station, based on average operation speed of the compressor.

14. The system according to claim 1, wherein the data from past refuelings comprises at least one of the following: number of refuelings, timestamp of each refueling, amount of hydrogen gas delivered to a vehicle, time it took to conduct the refueling, energy consumption.

15. The system according to claim 1, wherein the controller is further configured to optimize control in the time period between time A and time B further includes controlling the compressor to operate at a capacity above 100% of a rated capacity for a maximum 20 minutes.

16. The system according to claim 1, wherein the operation speed of the compressor is increased between time C and time D if a vehicle is attached to the dispenser.

\* \* \* \* \*